US012522809B2

(12) United States Patent
Tian et al.

(10) Patent No.: US 12,522,809 B2
(45) Date of Patent: Jan. 13, 2026

(54) TRANSAMINASE MUTANT, IMMOBILIZED TRANSAMINASE AND USE IN PREPARATION OF SITAGLIPTIN

(71) Applicant: ABIOCHEM BIOTECHNOLOGY (GROUP) CO., LTD., Shanghai (CN)

(72) Inventors: Zhenhua Tian, Shanghai (CN); Zhanbing Cheng, Shanghai (CN); Shaonan Ding, Shanghai (CN); Qi Jiao, Shanghai (CN); Juxi Hao, Shanghai (CN); Yongliang Ji, Shanghai (CN)

(73) Assignee: ABIOCHEM BIOTECHNOLOGY (GROUP) CO., LTD., Shanghai (CN)

( * ) Notice: Subject to any disclaimer, the term of this patent is extended or adjusted under 35 U.S.C. 154(b) by 765 days.

(21) Appl. No.: 17/790,283

(22) PCT Filed: Dec. 10, 2020

(86) PCT No.: PCT/CN2020/135136
§ 371 (c)(1),
(2) Date: Jun. 30, 2022

(87) PCT Pub. No.: WO2021/135886
PCT Pub. Date: Jul. 8, 2021

(65) Prior Publication Data
US 2023/0103175 A1   Mar. 30, 2023

(30) Foreign Application Priority Data

Dec. 31, 2019   (CN) .......................... 201911423071.1

(51) Int. Cl.
*C12N 9/10*   (2006.01)
*C12N 11/08*  (2020.01)
*C12N 15/70*  (2006.01)
*C12P 17/14*  (2006.01)
*C12P 17/18*  (2006.01)

(52) U.S. Cl.
CPC ............ *C12N 9/1096* (2013.01); *C12N 11/08* (2013.01); *C12N 15/70* (2013.01); *C12P 17/14* (2013.01); *C12P 17/182* (2013.01)

(58) Field of Classification Search
None
See application file for complete search history.

(56) References Cited

U.S. PATENT DOCUMENTS

| 7,326,708 | B2 | 2/2008 | Cypes et al. |
| 8,293,507 | B2 | 10/2012 | Savile et al. |
| 9,587,229 | B2 * | 3/2017 | Truppo ................ C12N 11/082 |
| 9,617,573 | B2 | 4/2017 | Quintanar-Audelo et al. |
| 11,499,172 | B2 * | 11/2022 | Cheng ............ C12Y 206/01018 |
| 11,965,193 | B2 * | 4/2024 | Cheng ..................... C12P 17/12 |
| 2020/0157587 | A1 | 5/2020 | Cheng et al. |

FOREIGN PATENT DOCUMENTS

| CN | 100430397 | C | 11/2008 |
| CN | 103608355 | A | 2/2014 |
| CN | 105164263 | A | 12/2015 |
| CN | 109251925 | A | 1/2019 |
| CN | 111549008 | A | 8/2020 |
| WO | 2010099501 | A2 | 9/2010 |
| WO | 2019011236 | A1 | 1/2019 |

OTHER PUBLICATIONS

Accession BBM56238. Oct. 23, 2014 (Year: 2014).*
Accession BBM56328. Sep. 4, 2014 (Year: 2014).*
International Search Report dated Mar. 10, 2021 issued in International Application No. PCT/CN2020/135136, with English translation, 13 pages.
Written Opinion of the International Searching Authority dated Mar. 10, 2021 issued in International Application No. PCT/CN2020/135136, with English translation, 10 pages.
Guan, Li-Jun, et al., "A new target region for changing the substrate specificity of amine transaminases", Scientific Reports, 5, 10753, doi: 10.1038/srep10753 (2015).
Priority application text of CN201911423071.1(CN113061594A), with English translation, 48 pages.
Notice of Reason for Refusal dated Sep. 24, 2024 issued in JP Application No. 2022-540794, with English translation, 5 pages.
First Office Action dated Mar. 31, 2023 issued in CN Patent Application No. 201911423071.1, with English translation, 9 pages.

(Continued)

*Primary Examiner* — Christian L Fronda
(74) *Attorney, Agent, or Firm* — FOLEY & LARDNER LLP

(57) ABSTRACT

Provided is use of immobilized transaminase in preparation of sitagliptin and/or (R)-3-amino-1-morpholine-4-(2,4,5-trifluorophenyl)-1-butanone. The immobilized transaminase comprises resin and a transaminase mutant, the amino acid sequence of the transaminase mutant is as shown in SEQ ID NO: 3 or SEQ ID NO: 7. Also provided is an immobilized transaminase, a transaminase mutant, a preparation method therefor and use thereof. The enzyme activity of the transaminase mutant in the catalysis of a ketoamide substrate is high, and the enzyme activity is still high after the transaminase mutant is prepared into the immobilized transaminase. When the transaminase mutant is used for catalyzing the ketoamide substrate to produce sitagliptin or an intermediate thereof, a screened solvent reaction system is combined, the immobilized transaminase is high in conversion rate and good in stereoselectivity and stability, the repeatability rate is improved, and the operation is simpler, thereby reducing the cost of production, and it is beneficial to industrial production.

20 Claims, No Drawings
Specification includes a Sequence Listing.

(56) References Cited

OTHER PUBLICATIONS

Search Report dated Mar. 31, 2023 issued in CN Patent Application No. 201911423071.1, with English translation, 4 pages.
Extended European Search Report dated Jan. 15, 2024 issued in European Patent Application No. 20910328.2, 6 pages.

* cited by examiner

TRANSAMINASE MUTANT, IMMOBILIZED TRANSAMINASE AND USE IN PREPARATION OF SITAGLIPTIN

CROSS-REFERENCE TO RELATED APPLICATIONS

This application is a 371 of PCT/CN2020/135136 filed Dec. 10, 2020, which claims priority to Chinese patent application No. 2019114230711, filed on Dec. 31, 2019, the contents of which are incorporated herein by reference in their entirety.

REFERENCE TO SEQUENCE LISTING

The Sequence Listing is submitted concurrently with the specification as an ASCII formatted text file via EFS-Web, with a file name of "P22412560US_SEQ.txt", a creation date of Jun. 30, 2022, and a size of 17,909 bytes. The Sequence Listing filed via EFS-Web is part of the specification and is incorporated in its entirety by reference herein.

TECHNICAL FIELD

The present invention belongs to the field of biotechnology, in particular relates to a transaminase mutant, immobilized transaminase and its use in preparation of sitagliptin or an intermediate thereof, and this invention also relates to a preparation method of sitagliptin.

BACKGROUND

Diabetes is a metabolic disease characterized by hyperglycemia and accompanied by metabolic disorders of protein, sugar and fat, due to changes in insulin secretion, which results in deficiency and weakened function of insulin, or decreased insulin activity, or under the combined influence of both reasons. Diabetes and its complications are the third most harmful disease to human health next to cardiovascular diseases and tumors. It has become an important disease endangering human health. Among the four types of diabetes, type II diabetes accounts for more than 90%. It is mostly seen in middle-aged and elderly people over 30 years old. The main cause is that the body is insensitive to insulin.

Sitagliptin phosphate is the first dipeptidyl peptidase-IV (DPP-4) inhibitor approved by FDA for the treatment of type II diabetes in 2006. It has obvious hypoglycemic effect when administrated alone or in combination with metformin and pioglitazone, and it is safe for administration, well tolerated and with few adverse reactions.

The U.S. Pat. No. 8,293,507 disclosed that the company Codexis used the transaminase obtained by modifying the transaminase from *Arthrobacter* to catalyze 4-oxo-4-[3-(trifluoromethyl)-5,6-dihydro-[1,2,4]triazolo[4,3-a]pyrazine-7-(8H)-yl]-1-(2,4,5 trifluorophenyl)butan-2-ketone to obtain sitagliptin ((2R)-4-oxy-4-[3-(trifluoromethyl)-5,6-dihydro-[1,2,4]triazolo[4,3-a]pyrazine-7-(8H)-yl]-1-(2,4,5-trifluorophenyl)butan-2-amine), sitagliptin was further phosphorylated to obtain sitagliptin phosphate. The modified transaminase is capable of converting the substrate 4-oxo-4-[3-(trifluoromethyl)-5,6-dihydro-[1,2,4]triazolo[4,3-a]pyrazine-7-(8H)-yl]-1-(2,4,5-trifluorophenyl)butan-2-ketone (referred to as sitadione in the present invention) to sitagliptin to a level detectable by HPLC-UV at 210 nm, under the conditions of 2 g/L ketoamide substrate, 0.5 M isopropylamine, 22° C., 5% DMSO, 100 μM pyridoxal phosphate (PLP) and 20 mg/mL transaminase polypeptide. The most effective mutant (SEQ ID NO: 110) has a catalytic conversion rate of 90-95%.

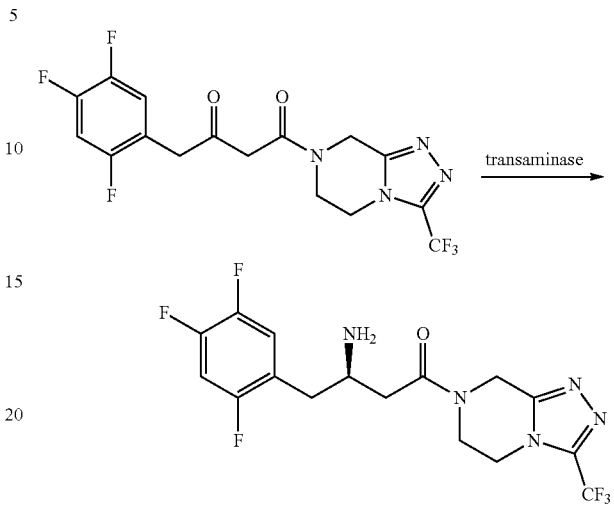

U.S. Pat. No. 9,617,573 continued to modify SEQ ID NO: 110 of U.S. Pat. No. 8,293,507. The obtained mutant is capable of converting the 4-oxo-4-[3-(trifluoromethyl)-5,6-dihydro-[1,2,4]triazolo[4,3-a]pyrazine-7-(8H)-yl]-1-(2,4,5-trifluorophenyl)butan-2-ketone to sitagliptin with at least 1.2 times the activity of SEQ ID NO: 110, under the conditions of 50 g/L ketoamide substrate, 1.5 μM isopropylamine, 55° C., 50% DMSO (v/v), 1 mM pyridoxal phosphate. The most effective mutant (SEQ ID NO: 130) has a catalytic conversion rate of 90-95%.

However, these transaminase mutants are unstable in 100% organic solvents, so the liquid enzymes are immobilized to obtain immobilized enzymes to improve the stability of transaminase in organic solvents. For example, U.S. Pat. No. 9,587,229 disclosed that SEQ ID NO: 110 of U.S. Pat. No. 8,293,507 was immobilized on SEPABEADS EXE120 resin. The results show that SEPABEADS EXE120 immobilized enzyme of SEQ ID NO: 110 could catalyze 100 g/L substrate 4-oxo-4-[3-(trifluoromethyl)-5,6-dihydro-[1,2,4] triazolo[4,3-a]pyrazine-7-(8H)-yl]-1-(2,4,5-trifluorophenyl) butan-2-ketone to sitagliptin in water saturated IPAc (isopropyl acetate) solvent, and the ee value was more than 99.9%. However, U.S. Pat. No. 9,587,229 did not study the reusable rate of immobilized enzyme (number of applicable batches). And since the reaction solvent is water saturated IPAc (isopropyl acetate) solvent, when using this solvent for production, IPAc needs to be water-saturated in advance, and the operation thereof is more cumbersome. If it is used for multi-batch reaction, the water content in the reaction system is not easy to control, which affects the water activity of immobilized enzyme, which makes the immobilized enzyme prone to inactivation and denaturation.

WO2019011236A1 reported that 1-morpholine-4-(2,4,5-trifluorophenyl)-1,3-butanedione (also referred to as morpholinedione in the present invention) can be catalyzed by transaminase to obtain (R)-3-amino-1-morpholine-4-(2,4,5-trifluorophenyl)-1-butanone, and then through multi-step reaction to obtain sitagliptin. However, liquid enzyme and aqueous solvent system containing a certain amount of DMSO are used in the reaction, so the substrate concentration is not high, the liquid enzyme cannot be reused, which makes the cost higher and the efficiency lower when this reaction system is used in production.

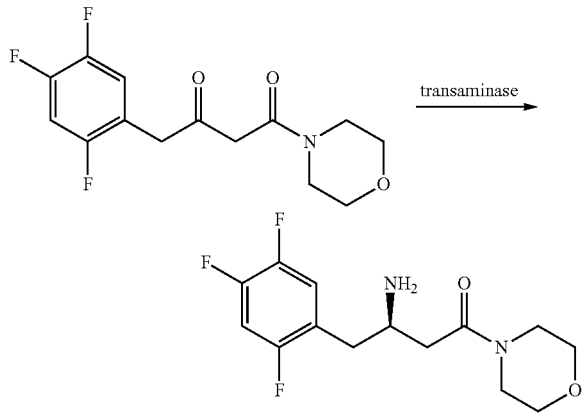

SUMMARY OF THE INVENTION

The technical problems to be solved by the present invention are to overcome the defects of low enzyme activity of transaminase in the prior art, low enzyme activity and poor stability when the transaminase is prepared into immobilized enzyme, and the defect that such immobilized enzyme has a high conversion rate and cannot be reused when applied to catalyze ketoamide substrate to produce sitagliptin or its intermediate. A transaminase mutant, immobilized transaminase and its use in preparation of sitagliptin or its intermediate are provided in the present invention. The transaminase mutant of the present invention has high enzymatic activity when catalyzing ketoamide substrate, and the enzyme activity retains high after it is prepared into immobilized transaminase. When the immobilized transaminase is used to catalyze ketoamide substrates to produce sitagliptin or its intermediates, combined with the screened solvent reaction system, the immobilized transaminase can achieve high conversion rate, good stereoselectivity, good stability, improved reusability and simpler operation, thereby it reduces the production cost and is conducive to industrial production.

The present inventors have conducted a large number of studies on transaminase in the prior art and found that the enzyme activity of the transaminase mutant is greatly increased when certain specific sites are mutated. And after continuing the immobilization study on these transaminase mutants, combined with the screened specific resin and screened specific solvent reaction system, the obtained immobilized enzyme has higher stability and higher conversion rate when used for catalyzing ketoamide substrate, and the cost is lower when used for the production of sitagliptin.

In order to solve the technical problems described above, the first aspect of the present invention is to provide: a use of an immobilized transaminase in preparation of sitagliptin and/or (R)-3-amino-1-morpholine-4-(2,4,5-trifluorophenyl)-1-butanone;
    wherein, the immobilized transaminase comprises resin and transaminase mutant, the transaminase mutant has an amino acid sequence of SEQ ID NO: 3 or SEQ ID NO: 7;
    preferably, the transaminase mutant has a nucleotide sequence of SEQ ID NO: 4 or SEQ ID NO: 8;
    preferably, the transaminase mutant is covalently bonded to the resin;
    preferably, the resin is epoxy resin; more preferably, SEPABEADS®EC HFA, ReliZyme™ HFA403, ReliZyme™ EP 113, ReliZyme™ EP403 and/or SEPABEADS®EC EP, e.g. SEPABEADS®EC HFA;
    more preferably, the preparation uses a reaction solvent of isopropanol aqueous solution, preferably volume content of water in the isopropanol aqueous solution (the volume ratio of water to the whole solution) is 2%-20%, and more preferably, reaction system for the preparation further comprises a cofactor for transaminases, such as pyridoxal phosphate, preferably at a concentration of 0.5-5 mg/mL.

In order to solve the technical problems described above, the second aspect of the present invention is to provide: an immobilized transaminase, which comprises resin and transaminase mutant, the transaminase mutant has an amino acid sequence of SEQ ID NO: 3 or SEQ ID NO: 7;
    preferably, the transaminase mutant has a nucleotide sequence of SEQ ID NO: 4 or SEQ ID NO: 8;
    preferably, the transaminase mutant is covalently bonded to the resin;
    preferably, the resin is preferably epoxy resin, preferably SEPABEADS®EC HFA, ReliZyme™ HFA403, ReliZyme™ EP 113, ReliZyme™ EP403 and/or SEPABEADS®EC EP, e.g. SEPABEADS®EC HFA.

In order to solve the technical problems described above, the third aspect of the present invention is to provide: a method for preparing immobilized transaminase, which comprises:
    1) contacting solution of transaminase mutant with the resin to form the immobilized transaminase, and the transaminase mutant has an amino acid sequence of SEQ ID NO: 3 or SEQ ID NO: 7;
    2) filtering and rinsing the immobilized transaminase;
    preferably, the transaminase mutant has a nucleotide sequence of SEQ ID NO: 4 or SEQ ID NO: 8;
    preferably, the transaminase mutant is covalently bonded to the resin;
    preferably, the resin is epoxy resin, more preferably SEPABEADS®EC HFA, ReliZyme™ HFA403, ReliZyme™ EP 113, ReliZyme™ EP403 and/or SEPABEADS®EC EP, e.g. SEPABEADS®EC HFA.

In order to solve the technical problems described above, the fourth aspect of the present invention is to provide: a method for preparing sitagliptin and/or (R)-3-amino-1-morpholine-4-(2,4,5-trifluorophenyl)-1-butanone, which comprises the step of catalyzing ketoamide substrate with immobilized transaminase in the presence of amino donor in the reaction solvent to obtain sitagliptin and/or (R)-3-amino-1-morpholine-4-(2,4,5-trifluorophenyl)-1-butanone;
    wherein, the immobilized transaminase is as described in the second aspect of the present invention, and/or the reaction solvent is isopropanol aqueous solution.
    preferably, the ketoamide substrate is 4-oxo-4-[3-(trifluoromethyl)-5,6-dihydro-[1,2,4]triazolo[4,3-a]pyrazine-7-(8H)-yl]-1-(2,4,5-trifluorophenyl)butan-2-ketone and/or 1-morpholine-4-(2,4,5-trifluorophenyl)-1,3-butanedione;
    preferably, the amino donor is isopropylamine;
    preferably, the molar ratio of the amino donor to the substrate is 1:1-5:1;
    preferably, when the reaction solvent is isopropanol aqueous solution, the volume content of water (the volume ratio of water to the whole solution) is 2%-20%;

preferably, the concentration of the ketoamide substrate is 20 g/L-200 g/L;
preferably, the mass ratio of the immobilized transaminase to the substrate is 1:1-6:1;
preferably, the prepared reaction system further comprises a cofactor of transaminase, such as pyridoxal phosphate, and its concentration is preferably 0.5-5 mg/mL;
preferably, temperature of the reaction is 30-60° C., preferably 45° C.

In order to solve the technical problems described above, the fifth aspect of the present invention is to provide: a transaminase mutant, the transaminase mutant has an amino acid sequence of SEQ ID NO: 3 or SEQ ID NO: 7;
preferably, the transaminase mutant has a nucleotide sequence of SEQ ID NO: 4 or SEQ ID NO: 8.

In order to solve the technical problems described above, the sixth aspect of the present invention is to provide: a polynucleotide encoding the transaminase mutant as described in the fifth aspect of the present invention.

In order to solve the technical problems described above, the seventh aspect of the present invention is to provide: a recombinant expression vector, which comprises the polynucleotide as described in the sixth aspect of the present invention;
preferably, skeleton of the recombinant expression vector is plasmid pET28a.

In order to solve the technical problems described above, the eighth aspect of the present invention is to provide: a transformant, which is prepared by introducing the polynucleotide as described in the sixth aspect of the present invention or the recombinant expression vector as described in the seventh aspect of the present invention into host;
preferably, the host is *Escherichia coli*; preferably *Escherichia coli* BL21.

In order to solve the technical problems described above, the ninth aspect of the present invention is to provide: A use of the transaminase mutant as described in the fifth aspect of the present invention in the preparation of sitagliptin and/or (R)-3-amino-1-morpholine-4-(2,4,5-trifluorophenyl)-1-butanone.

In order to solve the technical problems described above, the tenth aspect of the present invention is to provide: A use of reaction solvent in the preparation of sitagliptin and/or (R)-3-amino-1-morpholine-4-(2,4,5-trifluorophenyl)-1-butanone; the reaction solvent is isopropanol aqueous solution.
preferably, the use comprises the step of catalyzing ketoamide substrate with transaminase in isopropanol aqueous solution in the presence of amino donor to obtain sitagliptin and/or (R)-3-amino-1-morpholine-4-(2,4,5-trifluorophenyl)-1-butanone.
more preferably, the transaminase is the immobilized transaminase as described in the second aspect of the present invention and/or the transaminase mutant as described in the fifth aspect of the present invention.
more preferably, the ketoamide substrate is 4-oxo-4-[3-(trifluoromethyl)-5,6-dihydro-[1,2,4]triazolo[4,3-a]pyrazine-7-(8H)-yl]-1-(2,4,5-trifluorophenyl)butan-2-ketone and/or 1-morpholine-4-(2,4,5-trifluorophenyl)-1,3-butanedione;
more preferably, the amino donor is isopropylamine;
more preferably, the molar ratio of the amino donor to the substrate is 1:1-5:1;
more preferably, when the reaction solvent is isopropanol aqueous solution, the volume content of water (the volume ratio of water to the whole solution) is 2%-20%;

more preferably, the concentration of the ketoamide substrate is 20 g/L-200 g/L;
more preferably, the mass ratio of the immobilized transaminase to the substrate is 1:1-6:1;
more preferably, the prepared reaction system further comprises a cofactor of transaminase, such as pyridoxal phosphate, and its concentration is preferably 0.5-5 mg/mL;
more preferably, temperature of the reaction is 30-60° C., preferably 45° C.

In the present invention, the amount of isopropanol in the isopropanol aqueous solution is sufficient to allow the substrate to dissolve completely. The volume content of water in the isopropanol aqueous solution (the volume ratio of water to the whole solution) can be 2%-20%. Too little water will inactivate the immobilized enzyme, and too much water will not completely dissolve the substrate.

One aspect of the invention also provides a preparation method of sitagliptin phosphate, which comprises the following steps:
(1) preparing sitagliptin and/or (R)-3-amino-1-morpholine-4-(2,4,5-trifluorophenyl)-1-butanone according to the preparation method as described in the fourth aspect of the present invention;
(2) reacting sitagliptin and/or (R)-3-amino-1-morpholine-4-(2,4,5-trifluorophenyl)-1-butanone prepared in step (1) to obtain sitagliptin phosphate;
preferably, the sitagliptin phosphate is sitagliptin phosphate monohydrate.

In the present invention, the full name of the "ketoamide substrate 1 (also referred to as sitadione in the present invention)" is: 4-oxo-4-[3-(trifluoromethyl)-5,6-dihydro-[1,2,4]triazolo[4,3-a]pyrazin-7-(8H)-yl]-1-(2,4,5-trifluorophenyl)butan-2-ketone, the specific structural formula is as follows:

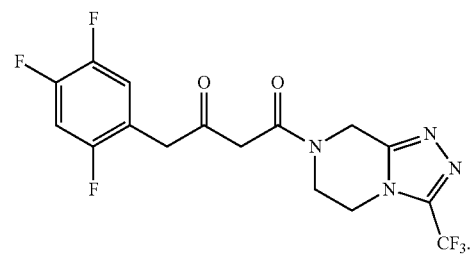 [SMILES: O=C(CC(=O)N1CCn2c(nnc2C(F)(F)F)C1)Cc1cc(F)c(F)cc1F]

In the present invention, the full name of the "ketoamide substrate 2 (also referred to as morpholinedione in the present invention)" is: 1-morpholine-4-(2,4,5-trifluorophenyl)-1,3-butanedione, the specific structural formula is as follows:

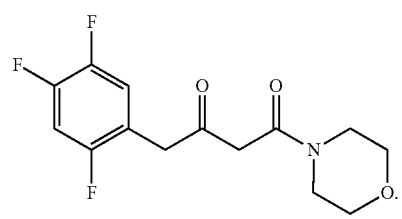 [SMILES: O=C(CC(=O)N1CCOCC1)Cc1cc(F)c(F)cc1F]

On the basis of conforming to common knowledge in the art, the above preferred conditions can be combined arbitrarily to obtain preferred examples of the present invention.

Reagents and raw materials used in the present invention are all commercially available.

The positive progressive effect of the present invention is that the transaminase mutant of the present invention has high enzyme activity when catalyzing ketoamide substrate, and the enzyme activity retains high after it is prepared into immobilized transaminase. When it is used to catalyze ketoamide substrate to produce sitagliptin or its intermediate, combined with the screened solvent reaction system, the immobilized transaminase can achieve high conversion rate, good stereoselectivity, good stability, improved reusability and simpler operation, which reduces the production cost and is conducive to industrial production.

DETAILED DESCRIPTION

The present invention is further illustrated hereinafter by means of Examples, but the present invention is not limited to the scope of the described Examples. Experimental methods without specific conditions specified in the following Examples shall be selected in accordance with conventional methods and conditions or in accordance with commodity instructions.

The experimental methods used in the present invention are conventional methods unless otherwise specified. Specific gene cloning operations can be referred to the "Molecular Cloning: A Laboratory Manual" edited by J. Sambrook et al.

The abbreviated symbols of amino acids in the present invention are conventional in the art unless otherwise specified, and the amino acids corresponding to the specific abbreviated symbols are shown in Table 1.

TABLE 1

| Amino acid name | Three-letter symbol | Single letter symbol |
|---|---|---|
| Alanine | Ala | A |
| Arginine | Arg | R |
| Asparagine | Asn | N |
| Aspartic acid | Asp | D |
| Cysteine | Cys | C |
| Glutanine | Gln | Q |
| Glutamic acid | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

The codon corresponding to the amino acid is also conventional in the art, and the corresponding relationship between the specific amino acid and the codon is shown in Table 2.

TABLE 2

| First nucleotide | Second nucleotide | | | | Third nucleotide |
|---|---|---|---|---|---|
| | T | C | A | G | |
| T | Phenylalanine F | Serine S | Tyrosine Y | Cysteine C | T |
| | Phenylalanine F | Serine S | Tyrosine Y | Cysteine C | C |
| | Leucine L | Serine S | Termination codon | Termination codon | A |
| | Leucine L | Serine S | Termination codon | Tryptophan W | G |
| C | Leucine L | Proline P | Histidine H | Arginine R | T |
| | Leucine L | Proline P | Histidine H | Arginine R | C |
| | Leucine L | Proline P | Glutamine Q | Arginine R | A |
| | Leucine L | Proline P | Glutamine Q | Arginine R | G |
| A | Isoleucine I | Threonine T | Asparagine N | Serine S | T |
| | Isoleucine I | Threonine T | Asparagine N | Serine S | C |
| | Isoleucine I | Threonine T | Lysine K | Arginine R | A |
| | Methionine M | Threonine T | Lysine K | Arginine R | G |
| G | Valine V | Alanine A | Aspartic acid D | Glycine G | T |
| | Valine V | Alanine A | Aspartic acid D | Glycine G | C |
| | Valine V | Alanine A | Glutamic acid E | Glycine G | A |
| | Valine V | Alanine A | Glutamic acid E | Glycine G | G |

Pet28a was purchased from Novagen; NdeI enzyme and HindIII enzyme were purchased from Thermo Fisher, and BL21 competent cells were purchased from Beijing Dingguo Changsheng Biotechnology Co., Ltd.

Example 1. Preparation of a Transaminase Mutant Enzyme Solution

The genes shown in the nucleotide sequences of SEQ ID NO: 2, SEQ ID NO: 4, SEQ ID NO: 6, and SEQ ID NO: 8 were synthesized by Suzhou Genewiz Biotechnology Co., Ltd. (C3 building, Bio-Nanotechnology Park, No. 218, Xinghu street, Suzhou Industrial Park). The above genes encode transaminases shown in SEQ ID NO: 1 (i.e. SEQ ID NO: 110 in U.S. Pat. No. 8,293,507), SEQ ID NO: 3, SEQ ID NO: 5 (i.e. SEQ ID NO: 130 in U.S. Pat. No. 9,617,573) and SEQ ID NO: 7 in the Sequence Listing, respectively.

TABLE 3

| Enzyme number | Amino acid sequence number | Nucleotide sequence number |
| --- | --- | --- |
| Enz.1 | 1 | 2 |
| Enz.1-M122Q-P223T | 3 | 4 |
| Enz.2 | 5 | 6 |
| Enz.2-M122F | 7 | 8 |

Then, the synthetic genes were enzymatically ligated to pET28a, with restriction sites NdeI & HindIII, and the enzymatically ligated vector was transformed into the host E. coli BL21 competent cells. The constructed strains were inoculated in TB culture, and incubated at 37° C. and 200 rpm in a shaker, for inducing overnight with IPTG at a concentration of 0.1 mM, and then the stains were harvested to obtain the engineered bacteria containing transaminase genes.

The engineered bacteria containing transaminase gene were activated by plate streaking, and then a single colony was picked and inoculated into 5 mL LB liquid medium containing 50 μg/mL kanamycin, and cultured under shaking at 37° C. for 12 h. At a rate of 2% (v/v), the medium was transferred to 150 mL fresh LB liquid medium containing 50 μg/mL kanamycin. After shaking at 37° C. until OD600 reached 0.8, IPTG was added at a final concentration of 0.5 mM, and the bacteria was induced at 18° C. for 16 h. After cultivation, the culture medium was centrifuged at 10,000 rpm for 10 min, then the supernatant was discarded, and the cells were collected and stored in a −80° C. ultra-low temperature refrigerator for further use.

2 g of the cells were collected after the cultivation was washed twice with 50 mM phosphate buffer (pH 7.4), the cells were then resuspended in 20 mL of phosphate buffer (pH 7.4) and sonicated, followed by centrifuging the solution to remove the precipitate. The obtained supernatant was the crude enzyme solution containing transaminase mutant. 10 mL of crude enzyme solution was purified by nickel column (Bestchrom Shanghai Biosciences Co., Ltd.) to obtain a pure enzyme solution, and the protein concentration was kept at about 4.5 mg/mL.

Ketoamide substrate 2 (morpholinedione) and ketone amide substrate 1 (sitadione) were used as substrates to determine enzyme activity, respectively. The determination method is as follows: 0.1 g of sitadione or morpholinedione was added with 2 mL of anhydrous ethanol, 6.4 mL of 0.1 mol/L triethanolamine buffer (pH 8.5), 1.6 mL of 2 mol/L isopropylamine hydrochloride solution (pH 8.5) and 0.003 g of pyridoxal phosphate (PLP) powder were added. The shaker was preheated at 37° C. for 30 min, and then 0.1 mL of pure enzyme solution placed on the shaker, the solution then reacted at 37° C. for 30 min. Next, 0.5 mL of 6N hydrochloric acid was added quickly and the solution was continuously shaken for 30 seconds to inactivate the enzyme. The samples were diluted with acetonitrile and detected by HPLC. The enzyme activity was calculated according to the standard curve. The results of enzyme activities of different mutants are shown in Table 4 below.

HPLC method: chromatographic column: C18 4.6×250 mm, 5 μm; detector: UV268 nm; column temperature: 40° C.; flow rate: 0.8 mL/min; injection volume: 20 μL; mobile phase A: water:acetonitrile:formic acid:ammonia water=950:50:0.5:0.5, pH should be between 3.60 and 3.80, if the pH cannot be maintained in such range, 10% ammonia water or 10% formic acid can be used to adjust the pH to 3.70; ammonium formate can also be used to adjust pH to 3.70; mobile phase B:water:acetonitrile=20:80; gradient elution: 100% A (0.01 min), 60% A+40% B (20 min), 60% A+40% B (40 min), 100% A (50 min), 100% A (60 min).

Retention time: morpholinedione: 27.828 min; (R)-3-amino-1-morpholine-4-(2,4,5-trifluorophenyl)-1-butanone: 14.835 min;

Retention time: sitadione: 34.811 min; sitagliptin: 17.489 min.

Retention time of morpholinedione control: 27.820 min;

Retention time of (R)-3-amino-1-morpholine-4-(2,4,5-trifluorophenyl)-1-butanone control: 14.856 min;

Retention time of sitadione control: 34.715 min;

Retention time of sitagliptin control (purchased from Beijing Yingxiang Technology Co., Ltd.): 17.705 min.

Wherein, morpholinedione substrate raw material and control (R)-3-amino-1-morpholine-4-(2,4,5-trifluorophenyl)-1-butanone were synthesized by the present company; the method refers to WO2019011236A1; the racemate of 3-amino-1-morpholine-4-(2,4,5-trifluorophenyl)-1-butanone was synthesized in the laboratory by ammoniation and catalytic hydrogenation of morpholinedione. Determination of the configuration of control (R)-3-amino-1-morpholine-4-(2,4,5-trifluorophenyl)-1-butanone: (R)-3-amino-1-morpholine-4-(2,4,5-trifluorophenyl)-1-butanone can be further reacted to prepare (3R)—N-tert-butoxycarbonyl-3-amino-4-(2,4,5-trifluorophenyl)-butyric acid (refer to WO2019011236A1); the R configuration could be determined by using the (3R)—N-tert-butoxycarbonyl-3-amino-4-(2,4,5-trifluorophenyl)-butyric acid standard (purchased from Anhui Haikang Pharmaceutical Co., Ltd.) as the control.

HPLC method for configuration determination:

Chromatographic column: Daicel Chiralpak AD-H (4.6 mm×250 mm, 5 μm); mobile phase: n-hexane:isopropanol=90:10; detection wavelength: 210 nm; flow rate: 1.0 mL/min; injection volume: 10 μL; column temperature: 25° C.; running time: 40 min.

The raw material of sitadione substrate was synthesized by the present laboratory, the synthesis method refers to CN100430397C. The racemate of sitagliptin was synthesized by the present laboratory, which is prepared by ammoniation and catalytic hydrogenation of sitadione.

TABLE 4

|  | Enz.2 | Enz.2-M122F | Enz.1 | Enz.1-M122Q-P223T |
|---|---|---|---|---|
| Enzyme activity (U/mL) with sitadione as substrate | 439 | 812 | 512 | 789 |
| Enzyme activity (U/mL) with morpholinedione as substrate | 57 | 121 | 75 | 243 |

As shown in Table 4, the enzyme activities of Enz.2-M122F and Enz.1-M122Q-P223T were significantly increased when sitadione or morpholinedione was used as the substrate. Wherein, the enzyme activity of Enz.2-M122F was about twice that of Enz.2. When Enz.1-M122Q-P223T catalyzed sitadione, the enzyme activity of Enz.1-M122Q-P223T increased by 50% compared with that of Enz.1. When Enz.1-M122Q-P223T catalyzed morpholinone, its enzyme activity was more than three times that of Enz.1.

Example 2. Preparation of Immobilized Transaminase Mutants 12 g of transaminase mutant bacterial sludge was mixed with 120 mL of 100 mM phosphate buffer. The cells were homogenized under high pressure, and the supernatant liquid containing enzyme was collected by centrifugation. 22 g of $K_2HIPO_4 \cdot 3H_2O$, 2.2 g of $KH_2PO_4$ and 0.024 g of PLP were added and stirred to dissolve. 10 g of resin was then added (see Table 5 for specific resin models, the resins were purchased from Suzhou Huitong Chromatography Separation and Purification Co., Ltd.) for fixation, followed by shaking the solution at 25° C. and 180 rpm for 20-25 h, and then subjected to suction filtration, deionization washing and suction filtration to obtain the immobilized enzyme. The immobilized enzyme activity was detected by using morpholinedione and sitadione as substrate, respectively. The enzyme activity detection method is as follows:

1.2 g of morpholinedione or sitadione substrate was placed into a 50 mL triangular flask, 19 mL of isopropanol, 0.6 mL of 16 mg/mL PLP solution and 0.4 mL of isopropylamine were added, the mixture was shaken at 45° C. until suspended solids were completely dissolved, and then was cooled to 37° C. for 30 min. 0.5 g of immobilized enzyme was added into a preheated substrate for reaction in a shaker at 200 rpm, 37° C. for 20 min. The reaction solution was sampled, and the sample was diluted with acetonitrile and detected by HPLC. The standard concentration curve of standard sitagliptin (purchased from Beijing Yingxiang Technology Co., Ltd.)/standard sitagliptin intermediate (R)-3-amino-1-morpholine-4-(2,4,5-trifluorophenyl)-1-butanone (synthesized by Applicant, the synthesis method refers to WO2019011236A1) was used to calculate the concentration of product sitagliptin (when morpholinedione was used as the substrate, the calculated product was sitagliptin intermediate (R)-3-amino-1-morpholine-4-(2,4,5-trifluorophenyl)-1-butanone), and then the immobilized enzyme activities were calculated. The results are shown in Table 5 below.

HPLC detection method is the same that in Example 1.

TABLE 5

| Enzyme number | Resin model | Isopropanol system U/g (morpholinedione as substrate) | Isopropanol system U/g (sitadrone as substrate) |
|---|---|---|---|
| Enz.1-M122Q-P233T | SEPABEADS ® EC HFA | 273 | 375 |
| Enz.1-M122Q-P233T | ReliZyme ™ HFA403 | 224 | 377 |
| Enz.1-M122Q-P233T | ReliZyme ™ EP113 | 258 | 353 |
| Enz.1-M122Q-P233T | ReliZyme ™ EP403 | 183 | 286 |
| Enz.1-M122Q-P233T | SEPABEADS ® EC EP | 200 | 324 |
| Enz.2-M122F | SEPABEADS ® EC HFA | 188 | 954 |

According to the immobilization effects of different resins as shown in Table 5, the immobilized enzyme prepared with SEPABEADS®EC HFA resin was selected for catalytic reaction.

Example 3. Catalysis of Morpholinedione by Immobilized Enzyme in Isopropanol System (Resin: SEPABEADS®EC HFA)

25 mL of isopropanol, 2.5 g of morpholinedione, 2 mL of water, 32 mg of PLP, 1.135 mL of isopropylamine and 10 g of immobilized enzyme prepared in Example 2 were added into a triangle flask, and the reaction was performed at 45° C. and 200 rpm in a shaker. After 24 hours of reaction, a sample was taken to detect the conversion rate. The immobilized enzyme was collected by filtering the reaction solution, then 25 mL of isopropanol, 2.5 g of morpholinedione, 2 mL of water, 32 mg of PLP and 1.135 mL of isopropylamine were added, and the reaction was performed at 45° C. and 200 rpm in a shaker. After 24 hours of reaction, a sample was taken to detect the conversion rate. The immobilized enzyme was reused according to the method described above. The results are shown in Table 6, which indicate that after the immobilized enzyme was applied for 10 batches of reaction, the conversion rates of Enz.1-M122Q-P233T and Enz.2-M122F remained above 85%, the ee value was >99.9%, and the immobilized enzyme was stable. Enz.1 and Enz.2 (not effective after 3 batches of application) had low conversion rates and were not suitable for catalyzing morpholinedione.

Wherein, the HPLC method for detecting the conversion rate is the same as that in Example 1.

Retention time: morpholinedione: 27.831 min; (R)-3-amino-1-morpholine-4-(2,4,5-trifluorophenyl)-1-butanone: 14.811 min.

Chiral HPLC method for detecting the ee value of the product is as follows:
chromatographic column: Daicel ChiralpakAD-H column 4.6 mm×250 mm, 5 μm; mobile phase: n-hexane: isopropanol:diethylamine=40:60:0.1; detector: UV268 nm; column temperature: 25° C.; flow rate: 0.8 mL/min; injection volume: 10 μL. Retention time: (S)-3-amino-1-morpholine-4-(2,4,5-trifluorophenyl)-1-butanone: 10.295 min, (R)-3-amino-1-morpholine-4-(2,4,5-trifluorophenyl)-1-butanone: 28.091 min.

Retention times of racemate control: 10.290 min and 28.087 min.

Retention time of (R)-3-amino-1-morpholine-4-(2,4,5-trifluorophenyl)-1-butanone control: 28.093 min.

ethanol:diethylamine=40:60:0.1; detector: UV268 nm; column temperature: 25° C.; flow rate: 0.8 mL/min; injection volume: 10 μL. retention time: (S)-enantiomer: 14.181, sitagliptin: 17.580.

Retention times of racemate control: 14.172 min and 17.702 min;

retention time of sitagliptin control: 17.665 min.

TABLE 6

| Batch | Reaction time/h | Conversion rate/% Enz.1-M122Q-P233T | Conversion rate/% Enz.2-M122F | Conversion rate/% Enz.1 | Conversion rate/% Enz.2 |
| --- | --- | --- | --- | --- | --- |
| 1 | 24 | 89.25 | 86.26 | 45.24 | 47.55 |
| 2 | 24 | 88.4 | 91.52 | 46.67 | 48.34 |
| 3 | 24 | 87.53 | 93.43 | 45.43 | 46.58 |
| 4 | 24 | 87.31 | 93.59 | / | / |
| 5 | 24 | 89.75 | 93.47 | / | / |
| 6 | 24 | 91.75 | 94.07 | / | / |
| 7 | 24 | 87.85 | 93.91 | / | / |
| 8 | 24 | 87.14 | 93.77 | / | / |
| 9 | 24 | 87.24 | 94.48 | / | / |
| 10 | 24 | 87.30 | 93.92 | / | / |
| average value | | 88.352 | 92.842 | 45.780 | 47.490 |
| standard deviation | | 1.496 | 2.443 | 0.777 | 0.882 |
| p-value | | 0.00027* | 0.00299# | / | / |

*: compared to the conversion of Enz.1; #: compared to the conversion of Enz.2; /: not applicable.

The above results indicate that the transaminase mutation of the present invention shows a better effect in the experiment of catalysis of morpholinedione by immobilized enzyme as compared with that of Enz.1 and Enz.2 in the prior art, and the difference was statistically significant (p-values were all less than 0.05, wherein, p-values were calculated using a two-tailed t-test).

Example 4. Catalysis of Sitadione by Immobilized Enzyme in Isopropanol System 25 mL of isopropanol, 3.75 g of sitadione, 2 mL of water, 32 mg of PLP, 1.7 mL of isopropylamine, and 10 g of immobilized enzyme prepared in Example 2 were added into a triangle flask, and the reaction was performed at 45° C. and 200 rpm in a shaker. After 24 hours of reaction, a sample was taken to detect the conversion rate. The immobilized enzyme was collected by filtering the reaction solution, then 25 mL of isopropanol, 3.75 g of sitadione, 2 mL of 16 mg/mL PLP aqueous solution, 1.7 mL of isopropylamine were added, and the reaction was performed at 45° C. and 200 rpm in a shaker. After 24 hours of reaction, a sample was taken to detect the conversion rate. The immobilized enzyme was reused according to the method described above. The results show that after the immobilized enzyme was applied for 10 batches of reaction, the conversion rate remained above 85%, the ee value was >99.9%, and the immobilized enzyme was stable. The specific application results are shown in Table 7 below.

Wherein, the HPLC method for detecting the conversion rate is the same as that in Example 1.

Retention time: sitadione: 34.827 min; sitagliptin: 17.394 min.

Chiral HPLC method for detecting the ee value of the product is as follows:

chromatographic column: Daicel ChiralpakAD-H column 4.6 mm×250 mm, 5 μm; mobile phase: n-heptane:

TABLE 7

| Batch | Reaction time/h | Conversion rate/% Enz.1-M122Q-P233T | Conversion rate/% Enz.2-M122F |
| --- | --- | --- | --- |
| 1 | 24 | 86.25 | 92.11 |
| 2 | 24 | 85.16 | 91.52 |
| 3 | 24 | 85.94 | 90.61 |
| 4 | 24 | 86.01 | 89.55 |
| 5 | 24 | 87.04 | 91.32 |
| 6 | 24 | 84.96 | 90.00 |
| 7 | 24 | 85.27 | 89.25 |
| 8 | 24 | 86.21 | 89.28 |
| 9 | 24 | 86.69 | 91.27 |
| 10 | 24 | 86.03 | 91.56 |

*: compared to the conversion of Enz.1; #: compared to the conversion of Enz.2; /: not applicable.

Compared with the following Comparative Example 1, combined with the result of catalytic reaction of morpholinedione in embodiment 3 above, it can be seen that the reaction solvent isopropanol of the present invention is more suitable for catalyzing sitardione and/or morpholinedione (lower standard deviation which means higher stability) than IPAc.

Example 5. Preparation of Sitagliptin Phosphate Monohydrate

After the reaction of Example 4 was completed, filtration was performed to obtain the immobilized enzyme and filtrate, and the filtrate was concentrated and dried at 60° C. to obtain a concentrate. 100 mL of dichloromethane was added to dissolve the concentrate, then 100 mL of purified water was added, and the mixture was stirred, followed by adjusting the pH of the solution to 2-3 with 30% concentrated hydrochloric acid, and the mixture was placed for stratification. Next, 100 mL of dichloromethane was added to the aqueous phase and stirred, followed by adding 30% sodium hydroxide solution to adjust the pH to 11, and the mixture was placed for stratification. 100 mL of dichloromethane was added to the aqueous phase again, and the mixture was stirred for extraction, and placed for stratification. The organic phases of the two alkaline extractions were combined and concentrated at 60° C., 120 mL of isopropanol was then added to the concentrate and stirred to dissolve; 10.6 g of 85% phosphoric acid was added. The mixture was heated up to 75° C. and the mixture was stirred to dissolve, and then was slowly cooled down to precipitate sitagliptin phosphate. After being stored at 5° C. for 2 hours, the mixture was filtered, and the filter cake was dried at 60° C. to obtain sitagliptin phosphate monohydrate.

Comparative Example 1. Catalysis of Sitadione by Immobilized Resin in IPAc (Isopropyl Acetate) System 25 mL of isopropyl acetate, 1.25 g of sitadione, 2 mL of 16 mg/mL PLP aqueous solution, 0.95 mL of isopropylamine, and 3.75 g of immobilized enzyme prepared in Example 2 were added into a triangle flask, and the reaction was performed at 45° C. and 200 rpm in a shaker. After 24 hours of reaction, a sample was taken to detect the conversion rate. The immobilized enzyme was collected by filtering the reaction solution, then 25 mL of isopropyl acetate, 1.25 g of sitadione, 2 mL of water and 32 mg of PLP, 0.95 mL of isopropylamine were added, and the reaction was performed at 45° C. and 200 rpm in a shaker. After 24 hours of reaction, a sample was taken to detect the conversion rate. The immobilized enzyme was reused according to the method described above. The results are shown in Table 8, which indicate that the stability of immobilized enzyme was poor (i.e. high standard deviation) and the conversion rate is low, after the immobilized enzyme is applied for three batches of reaction.

TABLE 8

| Batch | Conversion rate/% Enz.1-M122Q-P233T-SEPABE ADS ® EC HFA | Conversion rate/% Enz.2-SEPABEA DS ® EC HFA | Conversion rate/% Enz.1-SEPABEA DS ® EC HFA | Reaction time/h |
|---|---|---|---|---|
| 1 | 71.54 | 90.1 | 73.43 | 24 |
| 2 | 61.62 | 84.52 | 67.25 | 24 |
| 3 | 59.45 | 77.18 | 62.18 | 24 |
| average value | 64.203 | 83.933 | 67.62 | / |
| standard deviation | 6.446 | 6.480 | 5.634 | / |

/: not applicable.

Comparative Example 2. Catalysis of Morpholinedione by Immobilized Resin in IPAc (Isopropyl Acetate) System 25 mL of isopropyl acetate, 1.25 g of morpholinedione, 2 mL of water, 32 mg of PLP, 0.95 mL of isopropylamine, and 5 g of immobilized enzyme prepared in Example 2 were added into a triangle flask, and the reaction was performed at 45° C. and 200 rpm in a shaker. After 24 hours of reaction, a sample was taken to detect the conversion rate. The immobilized enzyme was collected by filtering the reaction solution, then 25 mL of isopropyl acetate, 1.25 g of morpholinedione, 2 mL of 16 mg/mL PLP aqueous solution and 0.95 mL of isopropylamine were added, and the reaction was performed at 45° C. and 200 rpm in a shaker. After 24 hours of reaction, a sample was taken to detect the conversion rate. The immobilized enzyme was reused according to the method described above. The results are shown in Table 9.

TABLE 9

| Batch | Conversion rate/% Enz.1-M122Q-P233T-SEPABE ADS ® EC HFA | Conversion rate/% Enz.2-SEPABEA DS ® EC HFA | Conversion rate/% Enz.1-SEPABEA DS ® EC HFA | Reaction time/h |
|---|---|---|---|---|
| 1 | 90.39 | 46.37 | 45.12 | 24 |
| 2 | 75.61 | 42.43 | 43.39 | 24 |
| 3 | 71.45 | 38.78 | 39.24 | 24 |
| average value | 79.150 | 42.527 | 42.583 | / |
| standard deviation | 9.954 | 3.796 | 3.022 | / |

/: not applicable.

Tables 8 and 9 show that in the water-saturated IPAc (isopropyl acetate) solvent system, after different immobilized enzymes catalyzed sitadione and morpholinedione for 3 batches, respectively, the stability of the immobilized enzyme was relatively poor and the conversion rate was low, wherein the conversion rate is significantly different from that of the immobilized enzyme of the present invention, which shows that the isopropyl acetate system is not suitable for the application of the immobilized enzyme.

The invention claimed is:

1. A transaminase mutant, wherein the transaminase mutant has the amino acid sequence of SEQ ID NO: 3 or SEQ ID NO: 7.

2. An immobilized transaminase, wherein the immobilized transaminase comprises a resin and the transaminase mutant of claim 1.

3. A method for preparing the immobilized transaminase of claim 2, which comprises:
1) contacting solution of the transaminase mutant with the resin to form the immobilized transaminase;
2) filtering and rinsing the immobilized transaminase.

4. A method for preparing sitagliptin or (R)-3-amino-1-morpholine-4-(2,4,5-trifluorophenyl)-1-butanone, which comprises a step of catalyzing a ketoamide substrate with the immobilized transaminase of claim 2 in the presence of an amino donor in a reaction solvent to obtain sitagliptin or (R)-3-amino-1-morpholine-4-(2,4,5-trifluorophenyl)-1-butanone;
wherein the reaction solvent is an isopropanol aqueous solution.

5. A method for preparing sitagliptin or (R)-3-amino-1-morpholine-4-(2,4,5-trifluorophenyl)-1-butanone using the immobilized transaminase of claim 2, comprising a step of catalyzing a ketoamide substrate with the immobilized transaminase of claim 2 in an isopropanol aqueous solution in the presence of an amino donor to obtain sitagliptin or (R)-3-amino-1-morpholine-4-(2,4,5-trifluorophenyl)-1-butanone.

6. A polynucleotide encoding the transaminase mutant of claim 1.

7. A recombinant expression vector, which comprises the polynucleotide of claim 6.

8. A transformant, which is prepared by introducing the polynucleotide of claim 6 into a host, wherein the host is *Escherichia coli*.

9. A method for preparing sitagliptin or (R)-3-amino-1-morpholine-4-(2,4,5-trifluorophenyl)-1-butanone using the transaminase mutant of claim 1, comprising a step of catalyzing a ketoamide substrate with the transaminase mutant of claim 1 in an isopropanol aqueous solution in the presence of an amino donor to obtain sitagliptin or (R)-3-amino-1-morpholine-4-(2,4,5-trifluorophenyl)-1-butanone.

10. A method for preparing sitagliptin or (R)-3-amino-1-morpholine-4-(2,4,5-trifluorophenyl)-1-butanone using a reaction solvent, wherein the reaction solvent is an isopropanol aqueous solution;
the method comprises a step of catalyzing a ketoamide substrate with the immobilized transaminase of claim 2 in the isopropanol aqueous solution in the presence of an amino donor to obtain sitagliptin or (R)-3-amino-1-morpholine-4-(2,4,5-trifluorophenyl)-1-butanone;
the ketoamide substrate is 4-oxo-4-[3-(trifluoromethyl)-5,6-dihydro-[1,2,4]triazolo[4,3-a]pyrazine-7-(8H)-yl]-1-(2,4,5-trifluorophenyl)butan-2-ketone or 1-morpholine-4-(2,4,5-trifluorophenyl)-1,3-butanedione;
the amino donor is isopropylamine;
the molar ratio of the amino donor to the substrate is 1:1-5:1;
when the reaction solvent is the isopropanol aqueous solution, the volume content of water is 2%-20%; or, the concentration of the ketoamide substrate is 20 g/L-200 g/L;
the mass ratio of the immobilized transaminase to the substrate is 1:1-6:1;
the prepared reaction system further comprises a cofactor for transaminase, wherein the cofactor is pyridoxal phosphate, and its concentration is 0.5-5 mg/mL; and
the temperature of the reaction is 30-60° C.

11. A method for preparing of sitagliptin phosphate, wherein, the method comprises the following steps:
(1) preparing sitagliptin or (R)-3-amino-1-morpholine-4-(2,4,5-trifluorophenyl)-1-butanone according to the method of claim 4;
(2) reacting sitagliptin or (R)-3-amino-1-morpholine-4-(2,4,5-trifluorophenyl)-1-butanone prepared in step (1) to obtain sitagliptin phosphate.

12. A transformant, which is prepared by introducing the recombinant expression vector of claim 7 into a host, wherein the host is *Escherichia coli*.

13. A method for preparing sitagliptin or (R)-3-amino-1-morpholine-4-(2,4,5-trifluorophenyl)-1-butanone using a reaction solvent, wherein the reaction solvent is an isopropanol aqueous solution;
the method comprises a step of catalyzing a ketoamide substrate with the transaminase mutant of claim 1 in the isopropanol aqueous solution in the presence of an amino donor to obtain sitagliptin or (R)-3-amino-1-morpholine-4-(2,4,5-trifluorophenyl)-1-butanone.

14. The transaminase mutant of claim 1, wherein the transaminase mutant is encoded by the nucleotide sequence of SEQ ID NO: 4 or SEQ ID NO: 8.

15. The immobilized transaminase of claim 2, wherein the transaminase mutant is covalently bonded to the resin; wherein the resin is epoxy resin.

16. The method of claim 5, wherein the volume content of water in the isopropanol aqueous solution is 2%-20%, or, wherein reaction system for the preparation further comprises a cofactor for transaminase, wherein the cofactor is pyridoxal phosphate, at a concentration of 0.5-5 mg/mL.

17. The recombinant expression vector of claim 7, wherein backbone of the recombinant expression vector is plasmid pET28a.

18. The method of claim 11, wherein the sitagliptin phosphate is sitagliptin phosphate monohydrate.

19. The method of claim 13, wherein the ketoamide substrate is 4-oxo-4-[3-(trifluoromethyl)-5,6-dihydro-[1,2,4]triazolo[4,3-a]pyrazine-7-(8H)-yl]-1-(2,4,5-trifluorophenyl)butan-2-ketone or 1-morpholine-4-(2,4,5-trifluorophenyl)-1,3-butanedione;
the amino donor is isopropylamine;
the molar ratio of the amino donor to the substrate is 1:1-5:1;
when the reaction solvent is the isopropanol aqueous solution, the volume content of water is 2%-20%; or, the concentration of the ketoamide substrate is 20 g/L-200 g/L;
the mass ratio of the immobilized transaminase to the substrate is 1:1-6:1;
the prepared reaction system further comprises a cofactor for transaminase, wherein the cofactor is pyridoxal phosphate, and its concentration is 0.5-5 mg/mL; and
the temperature of the reaction is 30-60° C.

20. The immobilized transaminase of claim 15, wherein the resin is SEPABEADS®EC HFA, ReliZyme™ HFA403, ReliZyme™ EP 113, ReliZyme™ EP403 or SEPABEADS®EC EP.

* * * * *

```
                        SEQUENCE LISTING

<160> NUMBER OF SEQ ID NOS: 8

<210> SEQ ID NO 1
<211> LENGTH: 330
<212> TYPE: PRT
<213> ORGANISM: Artificial Sequence
<220> FEATURE:
<223> OTHER INFORMATION: Synthetic Enz.1

<400> SEQUENCE: 1

Met Ala Phe Ser Ala Asp Thr Pro Glu Ile Val Tyr Thr His Asp Thr
1               5                   10                  15

Gly Leu Asp Tyr Ile Thr Tyr Ser Asp Tyr Glu Leu Asp Pro Ala Asn
            20                  25                  30

Pro Leu Ala Gly Gly Ala Ala Trp Ile Glu Gly Ala Phe Val Pro Pro
        35                  40                  45

Ser Glu Ala Arg Ile Ser Ile Phe Asp Gln Gly Phe Tyr Thr Ser Asp
    50                  55                  60

Ala Thr Tyr Thr Thr Phe His Val Trp Asn Gly Asn Ala Phe Arg Leu
65                  70                  75                  80

Gly Asp His Ile Glu Arg Leu Phe Ser Asn Ala Glu Ser Ile Arg Leu
                85                  90                  95

Ile Pro Pro Leu Thr Gln Asp Glu Val Lys Glu Ile Ala Leu Glu Leu
            100                 105                 110

Val Ala Lys Thr Glu Leu Arg Glu Ala Met Val Thr Val Thr Ile Thr
        115                 120                 125

Arg Gly Tyr Ser Ser Thr Pro Phe Glu Arg Asp Ile Thr Lys His Arg
    130                 135                 140

Pro Gln Val Tyr Met Ser Ala Cys Pro Tyr Gln Trp Ile Val Pro Phe
145                 150                 155                 160

Asp Arg Ile Arg Asp Gly Val His Leu Met Val Ala Gln Ser Val Arg
                165                 170                 175

Arg Thr Pro Arg Ser Ser Ile Asp Pro Gln Val Lys Asn Phe Gln Trp
            180                 185                 190

Gly Asp Leu Ile Arg Ala Ile Gln Glu Thr His Asp Arg Gly Phe Glu
        195                 200                 205

Leu Pro Leu Leu Leu Asp Cys Asp Asn Leu Leu Ala Glu Gly Pro Gly
    210                 215                 220

Phe Asn Val Val Val Ile Lys Asp Gly Val Val Arg Ser Pro Gly Arg
225                 230                 235                 240
```

Ala Ala Leu Pro Gly Ile Thr Arg Lys Thr Val Leu Glu Ile Ala Glu
            245                 250                 255

Ser Leu Gly His Glu Ala Ile Leu Ala Asp Ile Thr Pro Ala Glu Leu
            260                 265                 270

Tyr Asp Ala Asp Glu Val Leu Gly Cys Ser Thr Gly Gly Val Trp
        275                 280                 285

Pro Phe Val Ser Val Asp Gly Asn Ser Ile Ser Asp Gly Val Pro Gly
        290                 295                 300

Pro Val Thr Gln Ser Ile Ile Arg Arg Tyr Trp Glu Leu Asn Val Glu
305                 310                 315                 320

Pro Ser Ser Leu Leu Thr Pro Val Gln Tyr
            325                 330

<210> SEQ ID NO 2
<211> LENGTH: 1035
<212> TYPE: DNA
<213> ORGANISM: Artificial Sequence
<220> FEATURE:
<223> OTHER INFORMATION: Synthetic Enz.1

<400> SEQUENCE: 2
atgggcagca gccatcacca tcatcaccac agccaggatc cgatggcatt ctcagcagac      60
acgccggaaa ttgtttacac ccacgatacg ggcctggact acattcccta cagcgactac     120
gaactggacc cggcaaaccc gctggctggc ggtgcagcat ggattgaggg tgcgtttgtg     180
ccgccgagtg aagcccgtat ttccatcttt gatcagggtt tctatacgtc tgacgcaacc     240
tacaccacgt tcatgtttg aacggtaat gctttccgtc tgggcgacca cattgaacgc      300
ctgttcagca tgcagaatc tattcgcctg atcccgccgc tgacgcaaga tgaagtcaaa     360
gaaatcgcgc tggaactggt ggccaagacc gaactgcgtg aagccatggt caccgtgacg     420
attacccgcg gctatagctc tacgccgttt gaacgtgata tcaccaaaca tcgcccgcag     480
gtgtatatga gtgcgtgccc gtaccaatgg attgttccgt cgatcgtat ccgcgacggt      540 gtgcacctga tggttgcaca gagcgtccgt cgcaccccgc gtagttccat tgatccgcag     600
gtgaagaact tcaatggggg cgacctgatt cgtgcaatcc aagaaaccca tgatcgcggt     660
ttcgaactgc cgctgctgct ggattgtgac aacctgctgg ctgaaggtcc gggctttaat     720
gtggttgtca tcaaagatgg tgtggttcgt agcccgggtc gtgcagctct gccgggtatt     780
acgcgcaaga ccgttctgga aatcgcggaa tctctgggcc acgaagcgat tctggccgat     840
atcacgccgg cagaactgta cgatgctgac gaagttctgg gttgctcaac cggcggtggc     900
gtctggccgt tcgtttcggt cgatggtaat tcaatttcgg acggtgtgcc gggtccggtt     960
acccagagca ttatccgtcg ttactgggaa ctgaatgtgg aaccgtcgtc gctgctgacc    1020
ccggtgcaat actga                                                    1035

<210> SEQ ID NO 3
<211> LENGTH: 330
<212> TYPE: PRT
<213> ORGANISM: Artificial Sequence
<220> FEATURE:
<223> OTHER INFORMATION: Synthetic Enz.1-M122Q-P223T

<400> SEQUENCE: 3

Met Ala Phe Ser Ala Asp Thr Pro Glu Ile Val Tyr Thr His Asp Thr
1               5                   10                  15

Gly Leu Asp Tyr Ile Thr Tyr Ser Asp Tyr Glu Leu Asp Pro Ala Asn

```
            20                  25                  30
Pro Leu Ala Gly Gly Ala Ala Trp Ile Glu Gly Ala Phe Val Pro Pro
         35                  40                  45

Ser Glu Ala Arg Ile Ser Ile Phe Asp Gln Gly Phe Tyr Thr Ser Asp
 50                  55                  60

Ala Thr Tyr Thr Thr Phe His Val Trp Asn Gly Asn Ala Phe Arg Leu
 65                  70                  75                  80

Gly Asp His Ile Glu Arg Leu Phe Ser Asn Ala Glu Ser Ile Arg Leu
                 85                  90                  95

Ile Pro Pro Leu Thr Gln Asp Glu Val Lys Glu Ile Ala Leu Glu Leu
             100                 105                 110

Val Ala Lys Thr Glu Leu Arg Glu Ala Gln Val Thr Val Thr Ile Thr
             115                 120                 125

Arg Gly Tyr Ser Ser Thr Pro Phe Glu Arg Asp Ile Thr Lys His Arg
         130                 135                 140

Pro Gln Val Tyr Met Ser Ala Cys Pro Tyr Gln Trp Ile Val Pro Phe
145                 150                 155                 160

Asp Arg Ile Arg Asp Gly Val His Leu Met Val Ala Gln Ser Val Arg
                 165                 170                 175

Arg Thr Pro Arg Ser Ser Ile Asp Pro Gln Val Lys Asn Phe Gln Trp
             180                 185                 190

Gly Asp Leu Ile Arg Ala Ile Gln Glu Thr His Asp Arg Gly Phe Glu
         195                 200                 205

Leu Pro Leu Leu Leu Asp Cys Asp Asn Leu Leu Ala Glu Gly Thr Gly
210                 215                 220

Phe Asn Val Val Val Ile Lys Asp Gly Val Val Arg Ser Pro Gly Arg
225                 230                 235                 240

Ala Ala Leu Pro Gly Ile Thr Arg Lys Thr Val Leu Glu Ile Ala Glu
                 245                 250                 255

Ser Leu Gly His Glu Ala Ile Leu Ala Asp Ile Thr Pro Ala Glu Leu
             260                 265                 270

Tyr Asp Ala Asp Glu Val Leu Gly Cys Ser Thr Gly Gly Val Trp
         275                 280                 285

Pro Phe Val Ser Val Asp Gly Asn Ser Ile Ser Asp Gly Val Pro Gly
290                 295                 300

Pro Val Thr Gln Ser Ile Ile Arg Arg Tyr Trp Glu Leu Asn Val Glu
305                 310                 315                 320

Pro Ser Ser Leu Leu Thr Pro Val Gln Tyr
                 325                 330

<210> SEQ ID NO 4
<211> LENGTH: 993
<212> TYPE: DNA
<213> ORGANISM: Artificial Sequence
<220> FEATURE:
<223> OTHER INFORMATION: Synthetic Enz.1-M122Q-P223T

<400> SEQUENCE: 4
atggcattct cagcagacac gccggaaatt gtttacaccc acgatacggg cctggactac      60
attacctaca gcgactacga actgacccg gcaaacccgc tggctggcgg tgcagcatgg      120
attgagggtg cgtttgtgcc gccgagtgaa gcccgtattt ccatctttga tcagggtttc      180
tatacgtctg acgcaaccta caccacgttt catgtttgga acggtaatgc tttccgtctg      240
ggcgaccaca ttgaacgcct gttcagcaat gcagaatcta ttcgcctgat cccgccgctg      300
```

```
acgcaagatg aagtcaaaga atcgcgctg gaactggtgg ccaagaccga actgcgtgaa      360
gcccaggtca ccgtgacgat tacccgcggc tatagctcta cgccgtttga acgtgatatc     420
accaaacatc gcccgcaggt gtatatgagt gcgtgcccgt accaatggat tgttccgttc    480
gatcgtatcc gcgacggtgt gcacctgatg gttgcacaga gcgtccgtcg caccccgcgt    540
agttccattg atccgcaggt gaagaacttt caatggggcg acctgattcg tgcaatccaa    600
gaaacccatg atcgcggttt cgaactgccg ctgctgctgg attgtgacaa cctgctggct    660
gaaggtacgg gctttaatgt ggttgtcatc aaagatggtg tggttcgtag cccgggtcgt    720
gcagctctgc cgggtattac gcgcaagacc gttctggaaa tcgcggaatc tctgggccac    780
gaagcgattc tggccgatat cacgccggca gaactgtacg atgctgacga agttctgggt    840
tgctcaaccg gcggtggcgt ctggccgttc gtttcggtcg atggtaattc aatttcggac    900
ggtgtgccgg gtccggttac ccagagcatt atccgtcgtt actgggaact gaatgtggaa    960
ccgtcgtcgc tgctgacccc ggtgcaatac tga                                  993
```

```
<210> SEQ ID NO 5
<211> LENGTH: 330
<212> TYPE: PRT
<213> ORGANISM: Artificial Sequence
<220> FEATURE:
<223> OTHER INFORMATION: Synthetic Enz.2

<400> SEQUENCE: 5

Met Ala Phe Ser Ala Asp Thr Pro Glu Ile Val Tyr Thr His Asp Thr
1               5                   10                  15

Gly Leu Asp Tyr Ile Thr Tyr Ser Asp Tyr Glu Leu Asp Pro Ala Asn
            20                  25                  30

Pro Leu Ala Gly Gly Ala Ala Trp Ile Gly Gly Ala Phe Val Pro Pro
        35                  40                  45

Ser Glu Ala Arg Ile Pro Ile Phe Asp Gln Gly Phe Tyr Thr Ser Asp
    50                  55                  60

Ala Thr Tyr Thr Thr Phe His Val Trp Asn Gly Asn Ala Phe Arg Leu
65                  70                  75                  80

Gly Asp His Ile Glu Arg Leu Phe Ser Asn Ala Glu Ser Ile Arg Leu
                85                  90                  95

Ile Pro Pro Leu Thr Gln Asp Glu Val Lys Glu Ile Ala Leu Glu Leu
            100                 105                 110

Val Ala Lys Thr Glu Leu Arg Glu Ala Met Val Thr Val Thr Ile Thr
        115                 120                 125

Arg Gly Tyr Ser Ser Thr Pro Phe Glu Arg Asp Ile Thr Lys His Arg
    130                 135                 140

Pro Gln Val Tyr Met Phe Ala Ser Pro Tyr Leu Gln Ile Val Pro Phe
145                 150                 155                 160

Asp Arg Ile Arg Asp Gly Val His Leu Met Val Ala Gln Ser Val Arg
                165                 170                 175

Arg Thr Pro Arg Ser Ser Ile Asp Pro Gln Val Lys Asn Phe Gln Trp
            180                 185                 190

Gly Asp Leu Ile Arg Ala Ile Gln Glu Thr His Asp Arg Gly Phe Glu
        195                 200                 205

Leu Pro Leu Leu Leu Asp Gly Asp Asn Leu Leu Ala Glu Gly Pro Gly
    210                 215                 220

Phe Asn Val Val Val Ile Lys Asp Gly Val Val Arg Ser Pro Gly Arg
225                 230                 235                 240
```

Ala Ala Leu Pro Gly Ile Thr Arg Lys Thr Val Leu Glu Ile Ala Glu
            245                 250                 255

Ser Leu Gly His Glu Ala Ile Leu Ala Asp Ile Thr Pro Ala Glu Leu
        260                 265                 270

Tyr Asp Ala Asp Glu Val Leu Gly Cys Ser Thr Gly Gly Val Trp
    275                 280                 285

Pro Phe Val Ser Val Asp Gly Asn Ser Ile Ser Asp Gly Val Pro Gly
290                 295                 300

Pro Val Thr Gln Ser Ile Ile Arg Arg Tyr Trp Glu Leu Asn Val Glu
305                 310                 315                 320

Pro Ser Ser Leu Leu Thr Pro Val Gln Tyr
            325                 330

<210> SEQ ID NO 6
<211> LENGTH: 1053
<212> TYPE: DNA
<213> ORGANISM: Artificial Sequence
<220> FEATURE:
<223> OTHER INFORMATION: Synthetic Enz.2

<400> SEQUENCE: 6
atgggcagca gccatcatca tcatcatcac agcagcggcc tggtgccgcg cggcagccat      60
atggcattta gcgccgatac cccggaaatt gtgtacaccc acgacaccgg cctggattac     120
atcacctata gcgactacga actggatcct gccaacccgt tagcaggcgg tgccgcatgg     180
atcggcggtg catttgtgcc tccgagcgaa gcccgcatcc gatctttga ccagggcttt      240 tacaccagcg acgccaccta taccaccttc catgtgtgga acgtaacgc ctttcgcctg      300 ggtgatcata tcgagcgcct gtttagcaac gccgaaagca ttcgcctgat tcgccgtta     360 acccaggatg aggtgaaaga atcgccctg aactggtgg ccaaaacaga actgcgcgaa       420
gccatggtta ccgttacaat tacacgcggc tatagcagca cccccgttga acgtgacatc     480
accaaacacc gcccgcaggt gtacatgttt gcaagtccgt acctgcagat cgtgccgttt     540
gaccgcatcc gcgatggtgt tcatctgatg gttgcccaga gtgtgcgccg tacaccgcgc     600
agcagcattg acccgcaggt taagaacttc cagtggggcg acctgattcg cgcaatccag     660
gaaacccacg atcgcggttt tgagctgccg ctgctgctgg atggtgacaa tctgctggcc     720
gaaggtcctg gctttaacgt tggtggtatc aaagacggcg ttgttcgcag tccgggtcgt     780
gcagccttac cgggtatcac ccgcaaaacc gtgctggaaa tcgccgaaag cctgggccac     840
gaggccatcc tggccgatat tacccctgcc gaactgtacg atgccgatga ggtgctgggt     900
tgcagcaccg gtggtggtgt gtggccgttc gtgagcgtgg atggtaacag cattagcgat     960
ggtgtgccgg gtccggtgac ccagagcatc attcgtcgct attgggagct gaacgtggaa    1020
ccgagtagtc tgctgacccc ggtgcagtat taa                                 1053

<210> SEQ ID NO 7
<211> LENGTH: 330
<212> TYPE: PRT
<213> ORGANISM: Artificial Sequence
<220> FEATURE:
<223> OTHER INFORMATION: Synthetic Enz.2-M122F

<400> SEQUENCE: 7

Met Ala Phe Ser Ala Asp Thr Pro Glu Ile Val Tyr Thr His Asp Thr
1               5                   10                  15

Gly Leu Asp Tyr Ile Thr Tyr Ser Asp Tyr Glu Leu Asp Pro Ala Asn
            20                  25                  30

```
Pro Leu Ala Gly Gly Ala Ala Trp Ile Gly Gly Ala Phe Val Pro Pro
         35                  40                  45

Ser Glu Ala Arg Ile Pro Ile Phe Asp Gln Gly Phe Tyr Thr Ser Asp
     50                  55                  60

Ala Thr Tyr Thr Thr Phe His Val Trp Asn Gly Asn Ala Phe Arg Leu
 65                  70                  75                  80

Gly Asp His Ile Glu Arg Leu Phe Ser Asn Ala Glu Ser Ile Arg Leu
                 85                  90                  95

Ile Pro Pro Leu Thr Gln Asp Glu Val Lys Glu Ile Ala Leu Glu Leu
             100                 105                 110

Val Ala Lys Thr Glu Leu Arg Glu Ala Phe Val Thr Val Thr Ile Thr
             115                 120                 125

Arg Gly Tyr Ser Ser Thr Pro Phe Glu Arg Asp Ile Thr Lys His Arg
         130                 135                 140

Pro Gln Val Tyr Met Phe Ala Ser Pro Tyr Leu Gln Ile Val Pro Phe
145                 150                 155                 160

Asp Arg Ile Arg Asp Gly Val His Leu Met Val Ala Gln Ser Val Arg
                 165                 170                 175

Arg Thr Pro Arg Ser Ser Ile Asp Pro Gln Val Lys Asn Phe Gln Trp
             180                 185                 190

Gly Asp Leu Ile Arg Ala Ile Gln Glu Thr His Asp Arg Gly Phe Glu
         195                 200                 205

Leu Pro Leu Leu Leu Asp Gly Asp Asn Leu Leu Ala Glu Gly Pro Gly
210                 215                 220

Phe Asn Val Val Val Ile Lys Asp Gly Val Val Arg Ser Pro Gly Arg
225                 230                 235                 240

Ala Ala Leu Pro Gly Ile Thr Arg Lys Thr Val Leu Glu Ile Ala Glu
                 245                 250                 255

Ser Leu Gly His Glu Ala Ile Leu Ala Asp Ile Thr Pro Ala Glu Leu
             260                 265                 270

Tyr Asp Ala Asp Glu Val Leu Gly Cys Ser Thr Gly Gly Gly Val Trp
         275                 280                 285

Pro Phe Val Ser Val Asp Gly Asn Ser Ile Ser Asp Gly Val Pro Gly
290                 295                 300

Pro Val Thr Gln Ser Ile Ile Arg Arg Tyr Trp Glu Leu Asn Val Glu
305                 310                 315                 320

Pro Ser Ser Leu Leu Thr Pro Val Gln Tyr
                 325                 330

<210> SEQ ID NO 8
<211> LENGTH: 993
<212> TYPE: DNA
<213> ORGANISM: Artificial Sequence
<220> FEATURE:
<223> OTHER INFORMATION: Synthetic Enz.2-M122F

<400> SEQUENCE: 8
atggcattta gcgccgatac cccggaaatt gtgtacaccc acgacaccgg cctggattac      60
atcacctata gcgactacga actggatcct gccaacccgt tagcaggcgg tgccgcatgg     120
atcggcggtg catttgtgcc tccgagcgaa gcccgcatcc cgatctttga ccagggcttt     180
tacaccagcg acgccaccta taccaccttc catgtgtgga acggtaacgc ctttcgcctg     240
ggtgatcata tcgagcgcct gtttagcaac gccgaaagca ttcgcctgat tccgccgtta     300
acccaggatg aggtgaaaga gatcgccctg gaactggtgg ccaaaacaga actgcgcgaa     360
```

```
gccttcgtta ccgttacaat tacacgcggc tatagcagca ccccgtttga acgtgacatc    420
accaaacacc gcccgcaggt gtacatgttt gcaagtccgt acctgcagat cgtgccgttt    480
gaccgcatcc gcgatggtgt tcatctgatg gttgcccaga gtgtgcgccg tacaccgcgc    540
agcagcattg acccgcaggt taagaacttc cagtggggcg acctgattcg cgcaatccag    600
gaaacccacg atcgcggttt tgagctgccg ctgctgctgg atggtgacaa tctgctggcc    660
gaaggtcctg gctttaacgt ggtggtgatc aaagacggcg ttgttcgcag tccgggtcgt    720
gcagccttac cgggtatcac ccgcaaaacc gtgctggaaa tcgccgaaag cctgggccac    780
gaggccatcc tggccgatat tacccctgcc gaactgtacg atgccgatga ggtgctgggt    840
tgcagcaccg gtggtggtgt gtggccgttc gtgagcgtgg atggtaacag cattagcgat    900
ggtgtgccgg gtccggtgac ccagagcatc attcgtcgct attgggagct gaacgtggaa    960
ccgagtagtc tgctgacccc ggtgcagtat taa                                993
```